United States Patent [19]
malik et al.

[11] Patent Number: 6,061,454
[45] Date of Patent: May 9, 2000

[54] SYSTEM, METHOD, AND COMPUTER PROGRAM FOR COMMUNICATING A KEY RECOVERY BLOCK TO ENABLE THIRD PARTY MONITORING WITHOUT MODIFICATION TO THE INTENDED RECEIVER

[75] Inventors: Sohail malik; Michael Muresan, both of Gaithersburg, Md.

[73] Assignee: International Business Machines Corp., Armonk, N.Y.

[21] Appl. No.: 08/884,134

[22] Filed: Jun. 27, 1997

[51] Int. Cl.[7] .................. H04L 9/08; H04L 9/00; H04L 9/06

[52] U.S. Cl. .................... 380/278; 380/255; 380/277; 380/287; 380/29; 713/200; 713/201

[58] Field of Search .................. 380/9, 21, 29, 380/36, 37, 43, 49, 50, 59, 255, 277, 278–287; 713/150, 182, 189, 200, 201

[56] References Cited

U.S. PATENT DOCUMENTS

| | | | |
|---|---|---|---|
| 5,557,346 | 9/1996 | Lipner et al. | 380/21 |
| 5,557,765 | 9/1996 | Lipner et al. | 380/21 |
| 5,745,573 | 4/1998 | Lipner et al. | 380/21 |

*Primary Examiner*—Bernarr E. Gregory
*Attorney, Agent, or Firm*—Morgan & Finnegan, LLP

[57] ABSTRACT

A method is disclosed for communicating a key recovery block from a sender to a non-enabled receiver, without the danger of throwing the receiver into an indeterminant state, and without modifying the receiver. The method uses an unmodified communications protocol that has a standard method to receive and acknowledge arbitrary data. The sender sends a message using the standard method for arbitrary data, and includes in the message the key recovery block. The receiver responds with a standard acknowledgment message. The method thereby enables an entity coupled to the link, to monitor the key recovery block, even though the receiver is not enabled to process it.

39 Claims, 8 Drawing Sheets

SYSTEM, METHOD, AND COMPUTER PROGRAM FOR COMMUNICATING A KEY RECOVERY BLOCK TO ENABLE THIRD PARTY MONITORING WITHOUT MODIFICATION TO THE INTENDED RECEIVER

BACKGROUND OF THE INVENTION

1. Field of the Invention

This invention relates to data communications systems and methods, and more particularly relates to improvements in secure data communications.

2. Related Patent Applications

The invention disclosed herein is related to the invention disclosed in copending U.S. patent application by Johnson, et al entitled "TWO-PHASE CRYPTOGRAPHIC KEY RECOVERY SYSTEM", Ser. No. 08/725,102, filed Oct. 2, 1996, assigned to the IBM Corporation, and incorporated herein by reference, now U.S. Pat. No. 5,937,066.

The invention disclosed herein is also related to the invention disclosed in copending US Patent application by Gennaro, et al entitled "METHOD AND APPARATUS FOR VERIFIABLY PROVIDING KEY RECOVERY INFORMATION IN A CRYPTOGRAPHIC SYSTEM", Ser. No. 08/775,348, filed Jan. 3, 1997, assigned to the IBM Corporation, and incorporated herein by reference, now U.S. Pat. No. 5,907,618.

BACKGROUND

Cryptographic key recovery systems have been proposed as a compromise between the demands of communicating parties for privacy in electronic communications and the demands of law enforcement agencies for access to such communications when necessary to uncover crimes or threats to national security. Generally, in such key recovery systems, all or part of the key used by the communicating parties is made available to one or more key recovery agents. This is done either by actually giving the key portions to the key recovery agents (in which case the key portions are said to be "escrowed") or by providing sufficient information in the communication itself by encrypting the key portions in a key recovery block. The key recovery block allows the key recovery agents to regenerate the key portions. Key recovery agents would reveal the escrowed or regenerated key portions to a requesting law enforcement agent only upon presentation of proper evidence of authority, such as a court order authorizing the interception. The use of multiple key recovery agents, all of which must cooperate to recover the key, minimizes the possibility that a law enforcement agent can improperly recover a key by using a corrupt key recovery agent.

Key recovery systems serve the parties' interest in privacy, since their encryption system retains its full strength against third parties and does not have to be weakened to comply with domestic restrictions on encryption or to meet export requirements. At the same, key recovery systems serve the legitimate needs of law enforcement by permitting the interception of encrypted communications in circumstances where unencrypted communications have previously been intercepted (as where a court order has been obtained).

In addition to serving the needs of law enforcement, key recovery systems find application in purely private contexts. Thus, organizations may be concerned about employees using strong encryption of crucial files where keys are not recoverable. Loss of keys may result in loss of important stored data.

The above referenced Johnson, et al. patent application discloses a system for handling key recovery. It permits a portion of the key recovery information to be generated once and then used for multiple encrypted data communications sessions and encrypted file applications. In particular, the mentioned portion of the key recovery information that is generated just once is the portion that requires public key encryption operations. It provides a way of reducing the costly public key encryption operations.

Unlike other systems, the Johnson, et al. key recovery system does not contemplate encrypting the key (i.e., the key to be protected and recovered via the key recovery protocol) under the public key of a key recovery agent, nor does it contemplate splitting the key into parts or pieces or shares and encrypting these parts or pieces or shares of the secret key under the public keys of key recovery agents. Instead, in Johnson, et al, the information encrypted under the public keys of the key recovery agents, and which is the information that a requesting party would eventually provide to a key recovery agent in order to effect the step of key recovery, is comprised of a set of randomly generated keys (called key-generating keys) placed in a key recovery block. These keys are independent of and unrelated to the keys intended to be protected and recovered using the key recovery protocol. In fact, the generated key-generating keys can be encrypted with the public keys of the key recovery agents prior to knowing the value of the key or keys to be protected under the key recovery protocol. Thus, the Johnson, et al key recovery system permits the costly public key operations to be carried out (potentially) during times when the processing load of the device or system is low, or to spread the required processing over a potentially longer time than otherwise expected, if these operations had to be performed at the time when the key-to-be-protected is processed by the key recovery system. Johnson, et al permits the costly public key operations to be performed one time and then used in the key recovery process for enabling the recovery of multiple keys, over a potentially long period of time.

The above referenced Gennaro, et al. patent application discloses another system for handling key recovery. It is based on a variation of the three-party Diffie-Helman key agreement procedure. Without communication with the trustee, the sender is able to encrypt recovery information in a key recovery block in such a way that both the receiver and the respective trustee can decrypt it.

A number of other key recovery systems are available that are based on placing key recovery information in a key recovery block that is available for monitoring by third parties. For example, U.S. Pat. No. 5,557,346 to Lipner, et al, entitled "System and Method for Key Escrow Encryption", describes a sender splitting its session key KS and encrypting fragments KS1 and KS2 under the public keys of escrow agents. A law enforcement access field (LEAF) is formed by the sender as a concatenation of KS1 encrypted under the public key of a first agent and KS2 encrypted under the public key of a second agent. An encrypted leaf verification string ELVS is also formed by the sender as the concatenation of KS1 and KS2 encrypted using the session key KS. The LEAF and the ELVS are sent to the receiver as a key recovery block, along with the message of the sender encrypted under KS. The receiver can use the ELVS to verify that the LEAF is valid. The key recovery block and the encrypted message can be monitored by a law enforcement entity during the interval when it is sent to the receiver. The law enforcement entity can provide the LEAF to the respective agents, who will return KS1 and KS2, thereby enabling the law enforcement entity to recover KS and to decrypt the sender's message.

In most key recovery systems, the sender transmits to the receiver the key recovery block along with the encrypted data that has been encrypted under a key. The communications link over which this transmission takes place is accessible by a third party monitoring entity, such as the law enforcement entity. With proper authorization, the law enforcement entity can use the key recovery block to recover the key. In many key recovery scenarios, the receiver does not need the key recovery block. Indeed, the receiver may not possess a receiving process that can handle the key recovery block. For example, under the current or foreseeable laws of some nations, communications within national borders may be encrypted, but communications across national borders must be accompanied by a key recovery block. Thus, recipients of encrypted messages from foreign senders, must have a key recovery-enabled receiver. However, local recipients of encrypted messages from the same sender need not have an enabled receiver. If such a non-enabled receiver happens to receive the key recovery block, an indeterminant state can result which can impair the rest of the communications session. It is not desirable or feasible to require every potential receiver to become key recovery-enabled.

What is needed is a method for communicating a key recovery block from a sender to a non-enabled receiver, without the danger of throwing the receiver into an indeterminant state. What is needed is a way to accomplish this without modifying the receiver.

SUMMARY OF THE INVENTION

The invention is a method, system, and computer program for communicating a key recovery block from a sender to a non-enabled receiver, without the danger of throwing the receiver into an indeterminant state, and without modifying the receiver. The method thereby enables an entity coupled to the link, to monitor the key recovery block, even though the receiver is not enabled to process it.

The invention uses an unmodified communications protocol that has a standard method to receive and acknowledge arbitrary data. Under such a communications protocol, when the sender transmits a message using the standard method for arbitrary data, the receiver responds with a standard acknowledgment message. An example protocol is TCP/IP, which provides an echo request protocol to the sender and an echo reply protocol to the receiver.

In accordance with the invention, the sender sends a message using the standard method for arbitrary data, such as a TCP/IP echo request message using the echo request protocol, and includes in the message a key recovery block. The receiver responds with a standard acknowledgment message, such as by using the TCP/IP echo reply protocol. The receiver automatically responds by sending an echo reply message using the echo reply protocol.

In this manner, the invention can communicate a key recovery block from a sender to a non-enabled receiver, without the danger of throwing the receiver into an indeterminant state, and without the need to modify the receiver.

DESCRIPTION OF THE PREFERRED EMBODIMENTS

The invention communicates a key recovery block from a sender to a non-enabled receiver, without the danger of throwing the receiver into an indeterminant state, and without modifying the receiver. The method thereby enables an entity coupled to the link, to monitor the key recovery block, even though the receiver is not enabled to process it.

The sender sends a message using the standard method for arbitrary data, such as a TCP/IP echo request message using the echo request protocol, and includes in the message a key recovery block. The receiver responds with a standard acknowledgment message, such as by using the TCP/IP echo reply protocol. The receiver automatically responds by sending an echo reply message using the echo reply protocol. The discussion of the invention herein focuses on the use of the TCP/IP protocol. However, other communications protocols can be used that have a standard method to receive and acknowledge arbitrary data.

Figure 1A:
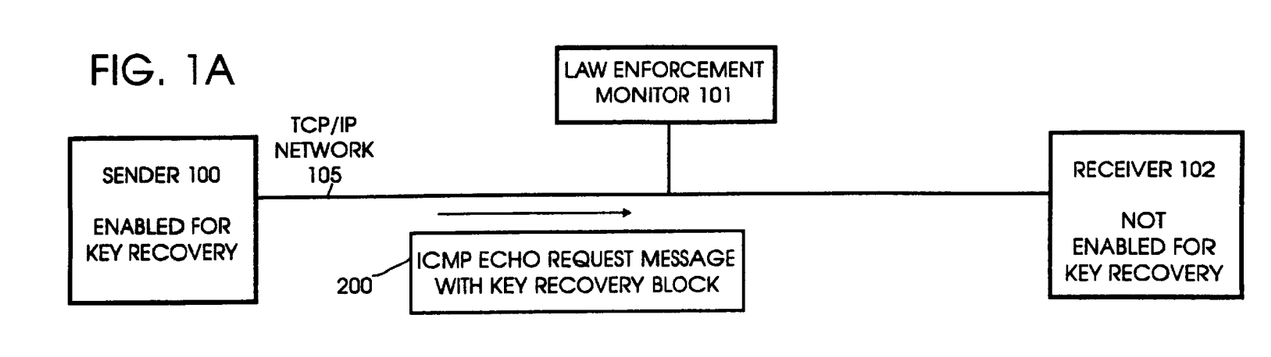
FIG. 1A shows the sender sending an echo request message with a key recovery block to a non-enabled receiver, using an echo request protocol. The law enforcement entity coupled to the link, can monitor the key recovery block, even though the receiver is not enabled to process it.
Figure 3A:
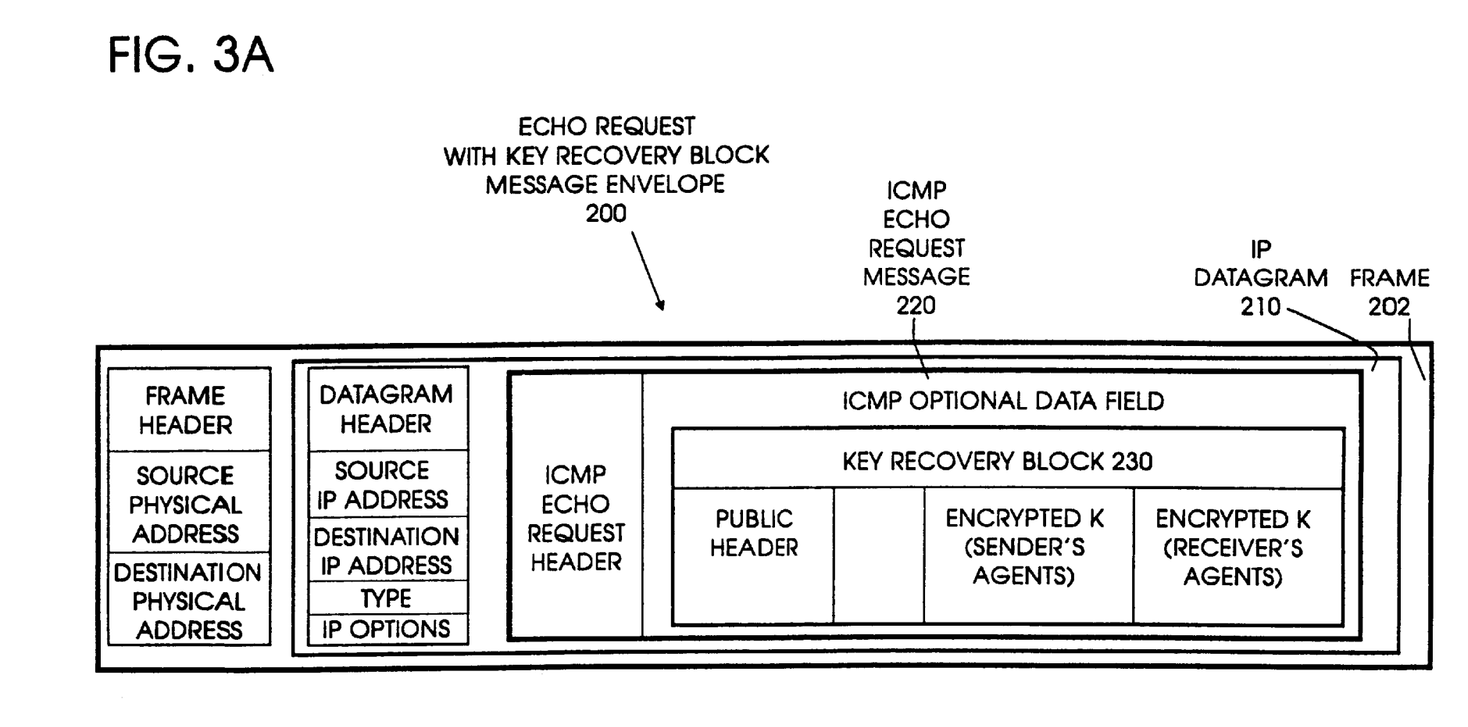
FIG. 3A shows the echo request with key recovery block message envelope 200.

FIG. 1A shows the sender 100 sending an echo request message 200 with a key recovery block to a non-enabled receiver 102, using an echo request protocol. The law enforcement entity 101 coupled to the link 105, can monitor the key recovery block, even though the receiver 102 is not enabled to process it. FIG. 3A shows the echo request with key recovery block message envelope 200. In the preferred embodiment of the invention, the TCP/IP communications protocol is used for sending the echo request message. The echo request message type of the Internet Control Message Protocol (ICMP) is used. This is referred to herein as the echo request protocol of the TCP/IP internet layer. A detailed description of the TCP/IP protocol is given in the book by Douglas Comer, entitled "Internetworking With TCP/IP, Volume 1, Principles, Protocols, and Architecture", Third Edition, Prentice Hall, 1995. The echo request message 200 is made up of a frame portion 202, and an IP datagram portion 210. The frame portion 202 includes a frame header that contains the source physical address of the sender and the destination physical address of the receiver. The IP datagram portion 210 includes a datagram header portion and a data portion. For normal data communication, the datagram header portion contains the source IP address of the sender, the destination IP address of the receiver, a type value, and IP options. IP the data portion contains the payload data.

When the IP datagram is used for an ICMP echo request, the data portion of the datagram includes an ICMP echo request header and an ICMP optional data field 220. In accordance with the preferred embodiment of the invention, the key recovery block 230 is placed in the ICMP optional data field 220. As is shown in FIG. 3A, the key recovery block 230 is contained in the ICMP optional data field 220. The key recovery block 230 can be prepared by any suitable key recovery method, such as those described in the above referenced Johnson et al and Gennaro, et al patent applications, or in the above referenced U.S. Pat. No. 5,557,346 to Lipner, et al.

Figure 1B:
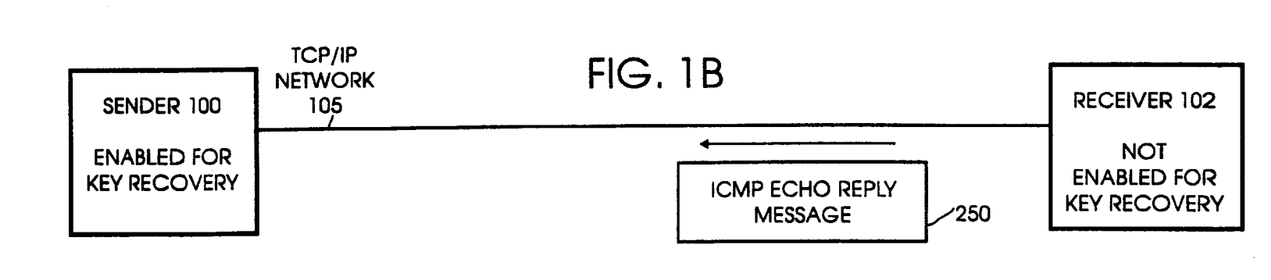
FIG. 1B shows the non-enabled receiver automatically responding by sending an echo reply message using an echo reply protocol. The echo reply confirms that the receiver is on-line.
Figure 3B:
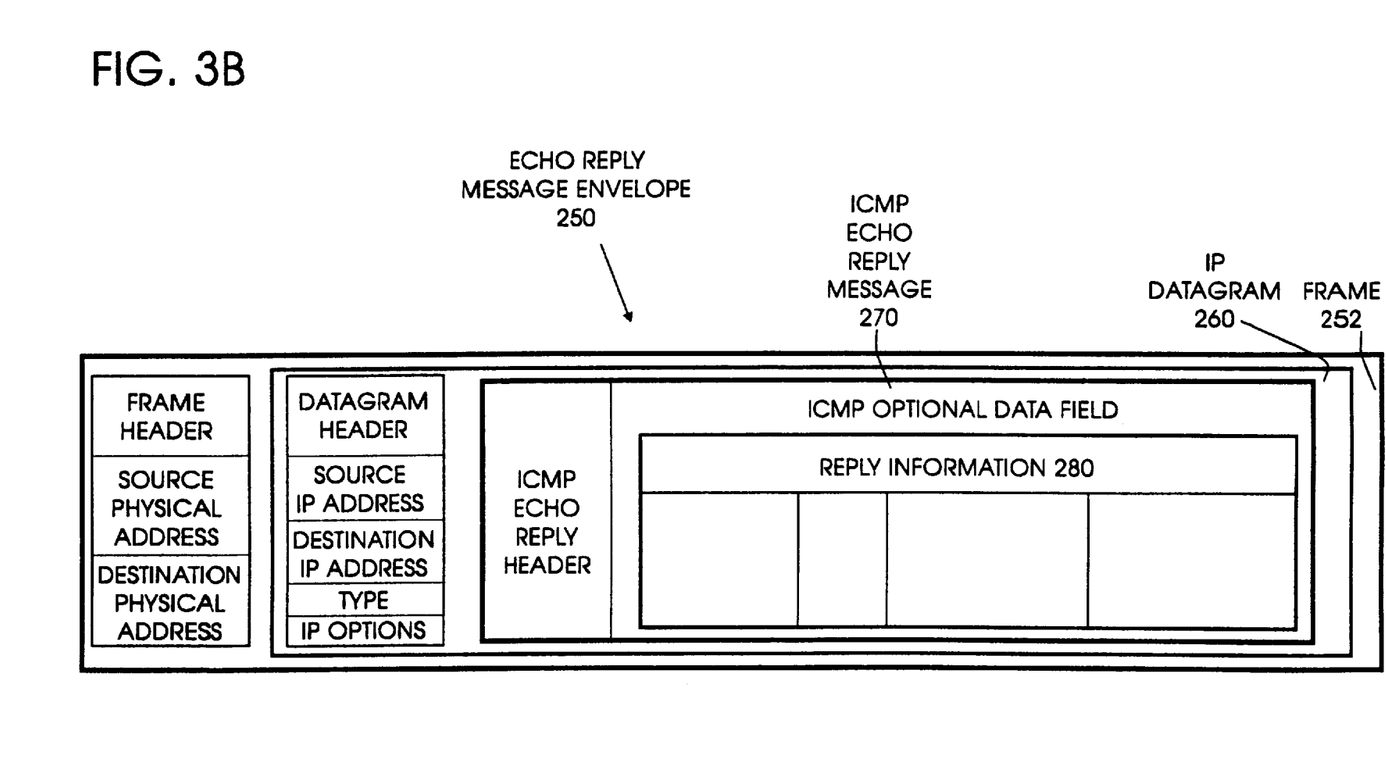
FIG. 3B shows the echo reply message envelope 250.

The system implementing the echo reply protocol at the receiver automatically responds by sending an echo reply message using the echo reply protocol. In the preferred embodiment of the invention, the TCP/IP communications protocol is used for sending the echo reply message. The ICMP echo request protocol of the TCP/IP internet layer is used. FIG. 1B shows the non-enabled receiver 102 automatically responding by sending an echo reply message 250 using an echo reply protocol. The echo reply confirms that the receiver 102 is on-line. FIG. 3B shows the echo reply message envelope 250. The echo reply message 250 is made up of a frame portion 252, and an IP datagram portion 260. The frame portion 252 includes a frame header that contains the source physical address of the receiver and the destination physical address of the sender. The IP datagram portion 260 includes a datagram header portion and a data portion. For normal data communication, the datagram header portion contains the source IP address of the receiver, the destination IP address of the sender, a type value, and IP options. IP the data portion contains the payload data.

When the IP datagram is used for an ICMP echo reply, the data portion of the datagram includes an ICMP echo reply header and an ICMP optional data field. In accordance with the preferred embodiment of the invention, the reply information 280 is placed in the ICMP optional data field. The reply contains a copy of the data sent in the request. As is shown in FIG. 3B, the reply information 280 is contained in the ICMP optional data field.

The receiver need not take any cognizance of the key recovery block accompanying the echo request message. The receiver replies to the echo request message, not the key recovery block. In an echo reply message, all or a part of the content of the echo request message is automatically "echoed" back to the sender. In this manner, the invention can communicate a key recovery block from a sender to a non-enabled receiver, without the danger of throwing the receiver into an indeterminant state. The invention thereby enables an entity coupled to the link, to monitor the key recovery block, even though the receiver is not enabled to process them.

Figure 1C:
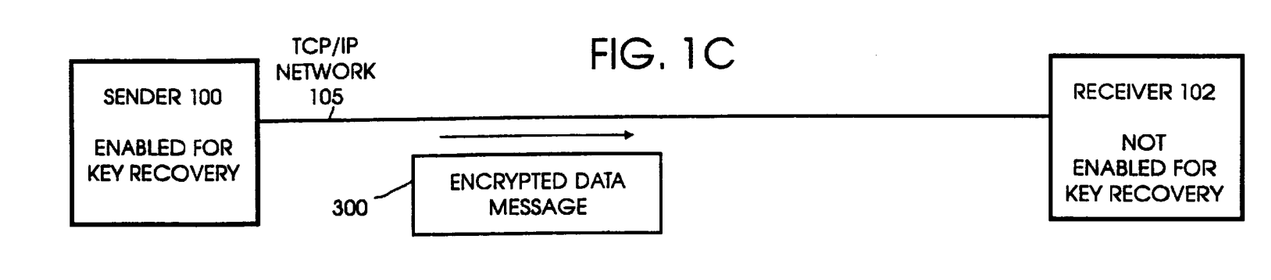
FIG. 1C shows the sender sending an encrypted data message to the non-enabled receiver.
Figure 3C:
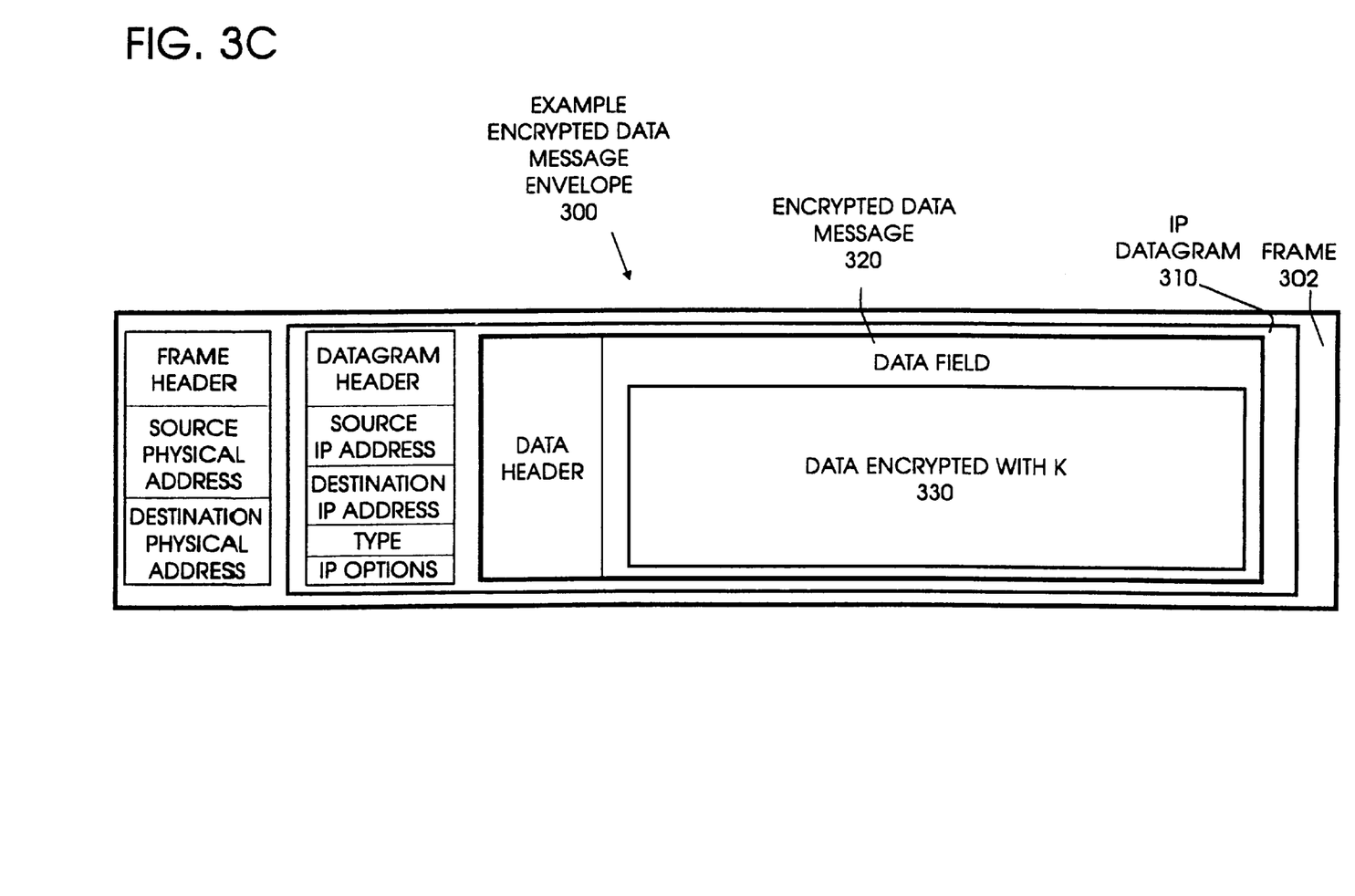
FIG. 3C shows the example encrypted data message envelope 300.

After the sender receives the echo reply message 250, the sender can begin sending data messages 300 encrypted with a key that can be recovered using the key recovery block from the sender 100 over the link to the receiver 102. FIG. 1C shows the sender sending an encrypted data message 300 to the non-enabled receiver 102. FIG. 3C shows the example encrypted data message envelope 300. In the example of FIG. 3C, the TCP/IP communications protocol is used for sending the encrypted data message 300. However, any suitable protocol can be used. For the TCP/IP example, the encrypted data message 300 is made up of a frame portion 302, and an IP datagram portion 310. The frame portion 302 includes a frame header that contains the source physical address of the sender and the destination physical address of the receiver. The IP datagram portion 310 includes a datagram header portion and a data portion. For normal data communication, the datagram header portion contains the source IP address of the sender, the destination IP address of the receiver, a type value, and IP options. IP the data portion 320 contains the payload data, which is the data encrypted with the key "K" 330.

Figure 2A:
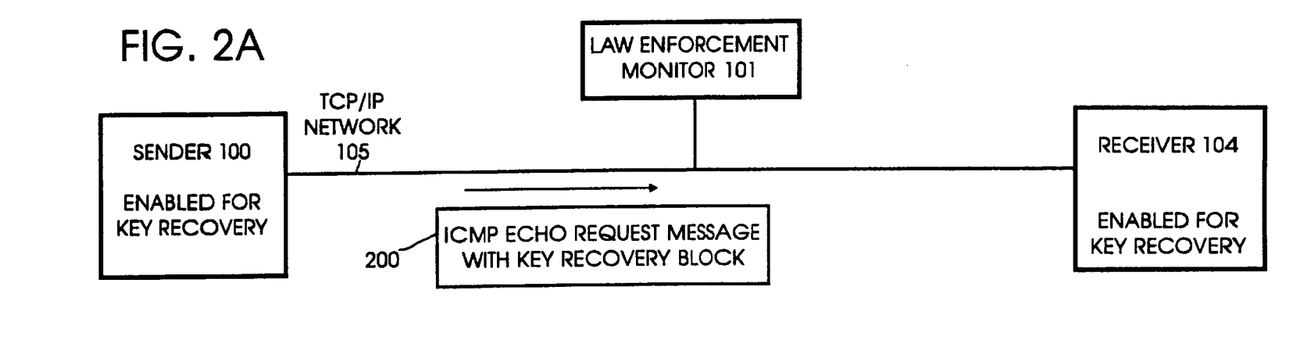
FIG. 2A shows the sender sending an echo request message with a key recovery block to an enabled receiver, using an echo request protocol. The law enforcement entity coupled to the link, can monitor the key recovery block.
Figure 2B:
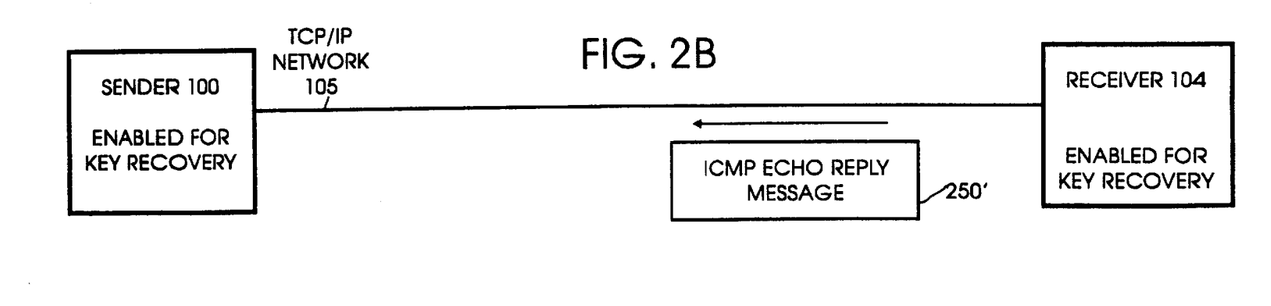
FIG. 2B shows the enabled receiver automatically responding by sending an echo reply message using an echo reply protocol. The echo reply confirms to the sender that the receiver is on-line.
Figure 2C:
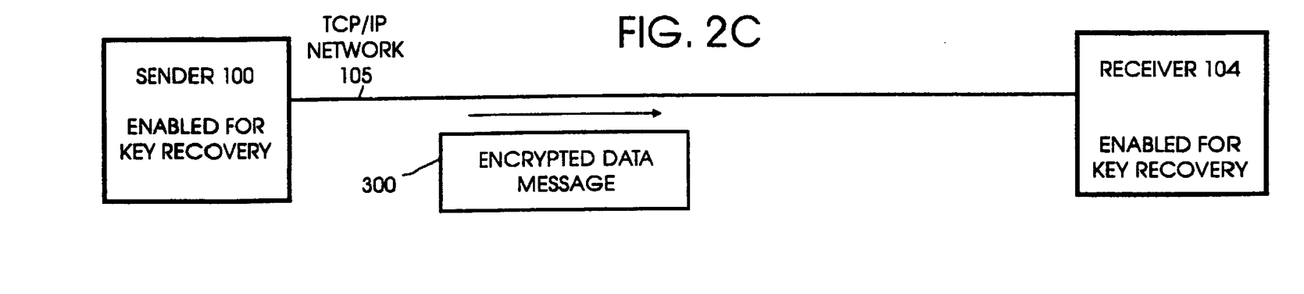
FIG. 2C shows the sender sending an encrypted data message to the enabled receiver.

FIG. 2A shows the sender 100 sending an echo request message 200 with a key recovery block to an enabled receiver 104, using an echo request protocol. The law enforcement entity 101 coupled to the link 105, can monitor the key recovery block. FIG. 2B shows the enabled receiver automatically responding by sending an echo reply message 250' using an echo reply protocol. The echo reply confirms to the sender that the receiver is on-line. FIG. 2C shows the sender sending an encrypted data message 300 to the enabled receiver. The key recovery program at the receiver can have the key recovery block available for verification or other operations, if desired.

Figure 4:
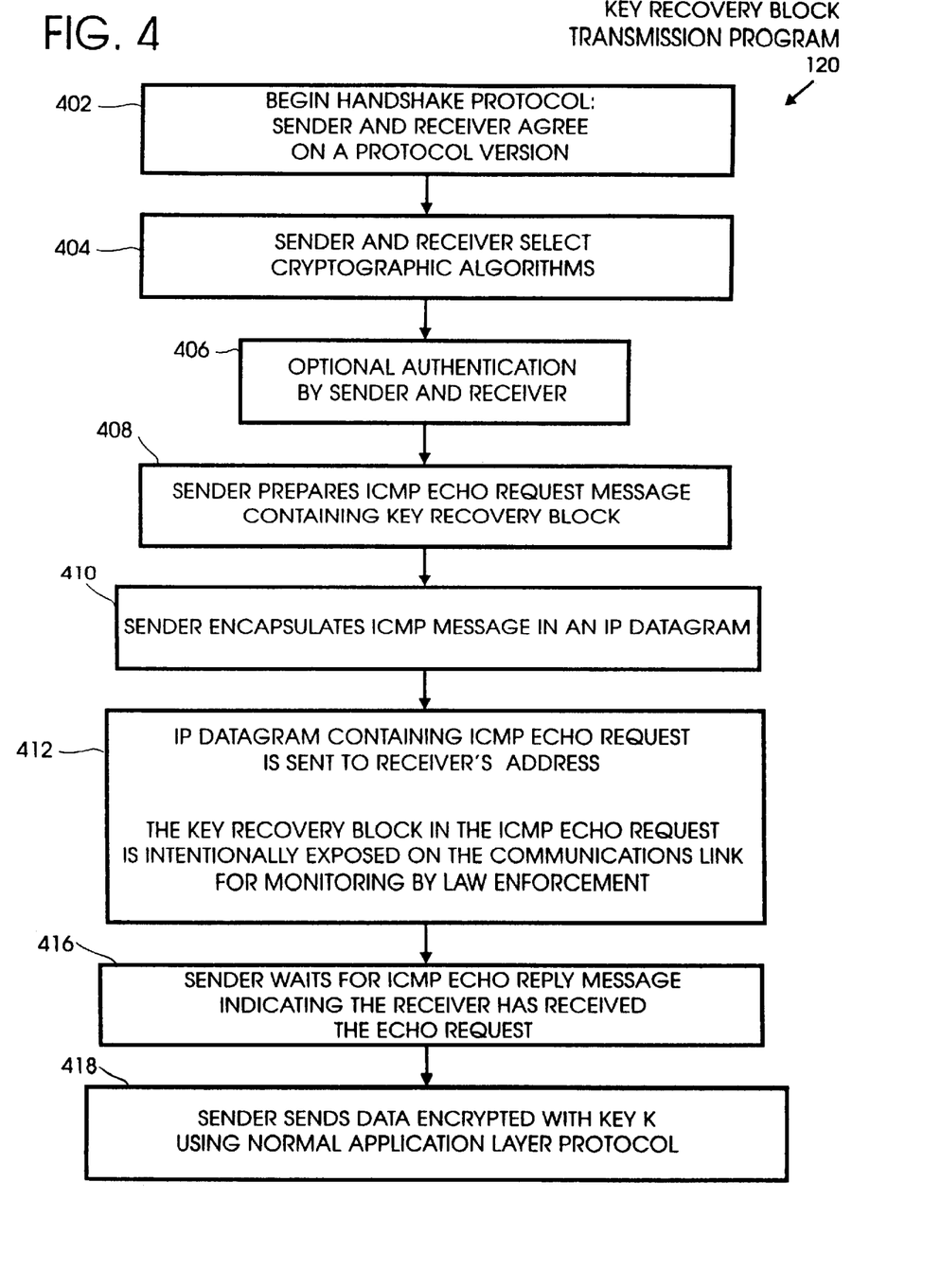
FIG. 4 shows a flow diagram of the key recovery block transmission program 120.

FIG. 4 shows a flow diagram of the key recovery block transmission program 120. Step 402 begins a handshake protocol during which the sender and receiver agree on a protocol version. In step 404 the sender and receiver select cryptographic algorithm. Step 406 provides an optional authentication by the sender and receiver.

Then, in step 408 of FIG. 4, the sender prepares an ICMP echo request message containing the key recovery block. The key recovery block can be prepared by any suitable key recovery method, such as those described in the above referenced Johnson et al and Gennaro, et al patent applications. In step 410, the sender encapsulates the ICMP message in an IP datagram. Then, in step 412, the IP datagram containing the ICMP echo request is sent to the receiver's address. The key recovery block in the ICMP echo request is intentionally exposed on the communications link for monitoring by the law enforcement entity. The key recovery can be accomplished by any suitable key recovery methods such are described in the above referenced Johnson et al and Gennaro, et al patent applications, or in the above referenced U.S. Pat. No 5,557,346 to Lipner, et al.

In step 416 of FIG. 4, the sender waits for the ICMP echo reply message indicating that the receiver is still on-line and that the echo request message reached the receiver. Then, in step 418, when the echo reply message has been received, the sender can send data encrypted with the key "K" using any protocol. Typically, this will be the normal application protocol layered (directly or indirectly) over the internet protocol layer of TCP/IP.

Figure 5:
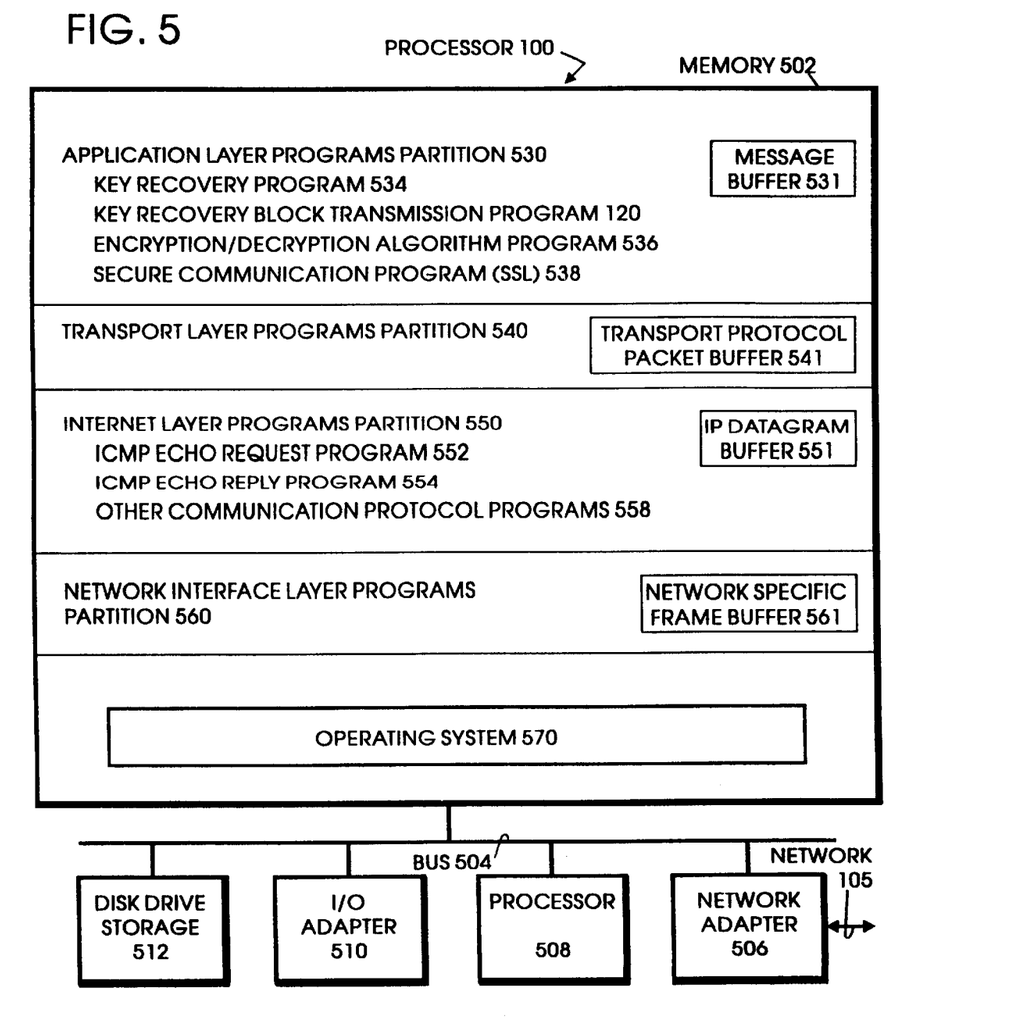
FIG. 5 shows an architectural diagram of the sender's computer 100.

FIG. 5 shows an architectural diagram of the sender's computer 100. Computer 100 includes the memory 502 that is connected by bus 504 to the network adapter 506, the processor 508, the I/O adapter 510, and the disk drive storage 512. The network adapter 506 connects the sender's computer 100 to the network 105. The processor 508 executes the instructions in programs stored in the memory 502. The memory 502 is organized into partitions corresponding to the layered protocol of TCP/IP. These partitions are the application layer programs partition 530, the transport layer programs partition 540, the internet layer programs partition 550, and the network interface layer programs 560. Also included in the memory 502 is the operating system program 570.

The application layer programs partition 530 includes a message buffer 531 and one or more application programs 532. Users invoke application programs in the application layer, that access services available across the network. An application program passes data in the required form to the transport layer for delivery. A key recovery program 534 is included, that enables the sender's computer to be a key recovery enabled computer. The key recovery program implements key recovery methods such are described in the above referenced Johnson et al and Gennaro, et al patent applications. The key recovery block transmission program 120 of FIG. 4 is included in the partition 530. An encryption/decryption algorithm program 536 is included to implement data encryption standard (DES), RSA, and other encryption methods. And, a secure communication program 538, such as the secure socket layer (SSL) protocol, is included in the partition 530. The SSL protocol is described in the Internet Draft entitled "The SSL Protocol, Version 3.0", by Alan Freier, et al, March 1996. The SSL protocol is designed to provide privacy to communications on the internet. Among the protocols provided by SSL is a handshake protocol that allows a server and a client on the network to authenticate each other and to negotiate an encryption algorithm and cryptographic keys before the application protocol transmits or receives its data.

The transport layer programs partition 540 includes the transport protocol packet buffer 541. The transport layer programs divide the stream of data being transmitted, into small packets and pass each packet along with a destination address to the next layer for transmission.

The internet layer programs partition 550 includes the IP datagram buffer 551. The internet layer encapsulates the packet in an IP datagram, fills in the datagram header, uses a routing algorithm to determine whether to deliver the datagram directly or send it to a router, and passes the datagram to the appropriate network interface for transmission. The ICMP echo request program 552 and the ICMP echo reply program 554 are included in the partition 550. A detailed description of the ICMP message delivery protocol is given in the book by Douglas Comer, entitled "Internetworking With TCP/IP, Volume 1, Principles, Protocols, and Architecture", Third Edition, Prentice Hall, 1995. Other internet layer programs could be used besides TCP/IP, if they provide an echo request and reply feature similar to that provided by ICMP.

The network interface layer programs partition 560 includes the network specific frame buffer 561. The network interface layer is responsible for accepting the IP datagrams and transmitting them over a specific network, using device drivers.

Figure 6:
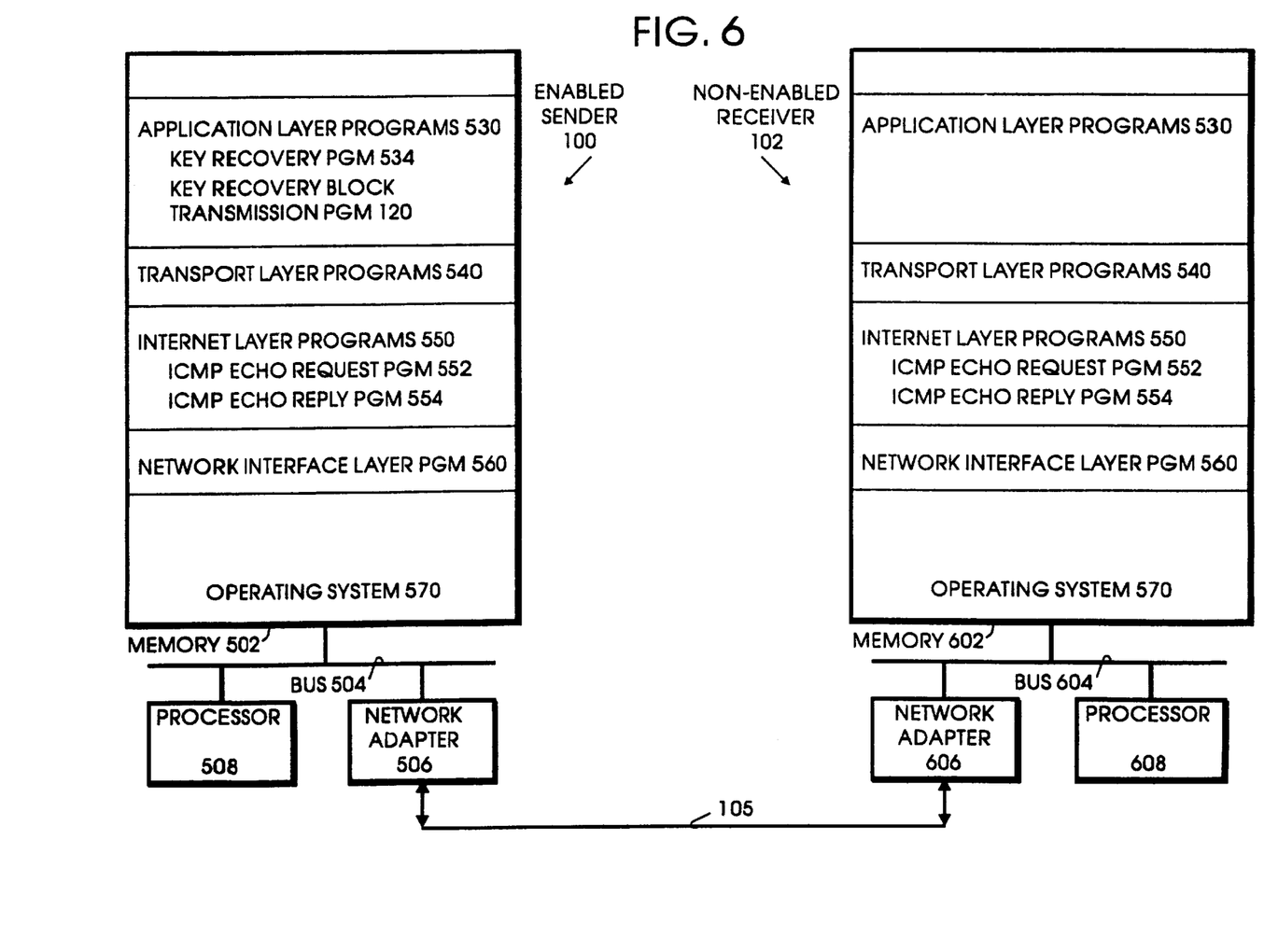
FIG. 6 shows a network diagram of the sender's computer 100 and the non-enabled receiver's computer 102.

FIG. 6 shows a network diagram of the sender's key recovery enabled computer 100 and the receiver's non-enabled computer 102. Receiver's computer 102 includes the memory 602 that is connected by bus 604 to the network adapter 606 and the processor 508. The network adapter 606 connects the receiver's computer 100 to the network 105. The processor 608 executes the instructions in programs stored in the memory 602. The memory 602 is organized into partitions corresponding to the layered protocol of TCP/IP. These partitions are the application layer programs partition 530, the transport layer programs partition 540, the internet layer programs partition 550, and the network interface layer programs 560. Also included in the memory 602 is the operating system program 570.

The application layer programs partition 530 in the receiver's non-enabled computer 102 does not include a key recovery program 534. The internet layer programs partition 550 in the receiver's non-enabled computer 102 includes the ICMP echo request program 552 and the ICMP echo reply program 554.

In this manner, the invention can communicate a key recovery block from a sender to a non-enabled receiver, without the danger of throwing the receiver into an indeterminant state, and without the need to modify the receiver.

Although a specific embodiment of the invention has been disclosed, it will be understood by those having skill in the art that changes can be made to that specific embodiment without departing from the spirit and scope of the invention.

What is claimed is:

1. A method for communicating a key recovery block signal from a sender to a receiver over a communication link, for an entity coupled to the link, to monitor the key recovery block signal, comprising:

providing an echo request protocol program to the sender;

providing an echo reply protocol program to the receiver;

sending an echo request message signal with a key recovery block signal from the sender using said echo request protocol request message, over the link to the sender; and sending an echo reply message signal from the receiver using said echo reply protocol in response to the echo request message signal, over the link to the sender.

2. The method of claim 1, which further comprises:

sending a data message signal encrypted with a key capable of recovery using the key recovery block signal from the sender over the link to the receiver.

3. The method of claim 2, which further comprises:

said entity monitoring data in the encrypted data message by means of the key recovery block signal.

4. The method of claim 3, which further comprises:

said entity recovering the key using the key recovery block.

5. The method of claim 4, which further comprises:

said entity decrypting the encrypted data message using the recovered key.

6. The method of claim 2, wherein:

the echo request protocol and the echo reply protocol are part of the same communications protocol program.

7. The method of claim 6, wherein:

the communications protocol is TCP/IP.

8. The method of claim 7, wherein:

the echo request message is an ICMP echo request.

9. The method of claim 8, wherein:

the echo reply message is an ICMP echo reply.

10. The method of claim 6, wherein:

the data message is sent using another protocol than the communications protocol.

11. A system for communicating a key recovery block signal from a sender to a receiver over a communication link, for an entity coupled to the link, to monitor the key recovery block signal, comprising:

an echo request protocol means in the sender;

an echo reply protocol means in the receiver;

means for sending an echo request message signal with a key recovery block signal from the sender using an echo request protocol provided by said echo request protocol means over the link to the receiver; and means for sending an echo reply message signal from the receiver using an echo reply protocol provided by said echo reply protocol means in response to the echo request message, over the link to the sender.

12. The system of claim 11, which further comprises:
means for sending a data message signal encrypted with a key capable of recovery using the key recovery block signal from the sender over the link to the receiver.

13. The system of claim 12, which further comprises:
means for said entity monitoring data in the encrypted data message by means of the key recovery block signal.

14. The system of claim 13, which further comprises:
means for the entity to recover the key to be recovered using the key recovery block.

15. The system of claim 14, which further comprises:
means for the entity to decrypt the encrypted data message using the recovered key.

16. The system of claim 12, wherein:
the echo request protocol and the echo reply protocol are part of the same communications protocol program.

17. The system of claim 16, wherein:
the communications protocol is TCP/IP.

18. The system of claim 17, wherein:
the echo request message is an ICMP echo request.

19. The system of claim 18, wherein:
the echo reply message is an ICMP echo reply.

20. The system of claim 16, wherein:
the data message is sent using another protocol than the communications protocol.

21. A article of manufacture for a computer for communicating a key recovery block signal from a sender to a receiver over a communication link, for an entity coupled to the link, to monitor the key recovery block signal, comprising:
a computer readable medium;
computer program means in said medium or providing an echo request protocol program to the sender;
computer program means in said medium for providing an echo reply protocol program to the receiver;
computer program means in said medium for sending an echo request message signal with a key recovery block signal from the sender using said echo request protocol over the link to the receiver; and
computer program means in said medium for sending an echo reply message signal from the receiver using said echo reply protocol in response to the echo request message, over the link to the sender.

22. The article of manufacture for a computer of claim 21, which further comprises:
computer program means in said signal for sending a data message signal encrypted with a key capable of recovery using the key recovery block signal from the sender over the link to the receiver.

23. The article of manufacture for a computer of claim 22, which further comprises:
computer program means in said medium for said entity to monitor data in the encrypted data message by means of the key recovery block signal.

24. The article of manufacture for a computer of claim 23, which further comprises:
computer program means in said medium for the entity to recover the key to be recovered using the key recovery block.

25. The article of manufacture for a computer of claim 24, which further comprises:
computer program means in said medium for the entity to decrypt the encrypted data message using the recovered key.

26. The article of manufacture for a computer of claim 22, wherein:
the echo request protocol and the echo reply protocol are part of the same communications protocol program.

27. The article of manufacture for a computer of claim 26, wherein:
the communications protocol is TCP/IP.

28. The article of manufacture for a computer of claim 27, wherein:
the echo request message is an ICMP echo request.

29. The article of manufacture for a computer of claim 28, wherein:
the echo reply message is an ICMP echo reply.

30. The article of manufacture for a computer of claim 26, wherein:
the data message is sent using another protocol than the communications protocol.

31. A method for communicating a key recovery block signal from a sender to a receiver over a communication link using a first communications protocol program that has a first sending method for a sender to send arbitrary data and a first receiving method for a receiver to receive and acknowledge the arbitrary data, for an entity coupled to the link to monitor the key recovery block signal, comprising:
sending a message signal by a sender using the first sending method to send arbitrary data, and including in the message a key recovery block signal; and
receiving and acknowledging the message by a receiver with an acknowledge signal using the first receiving method to receive and acknowledge the arbitrary data.

32. The method of claim 31, which further comprises:
sending a data message signal over the link encrypted with a key capable of recovery using the key recovery block signal.

33. The method of claim 32, which further comprises:
said entity monitoring data in the encrypted data message by means of the key recovery block signal.

34. A system for communicating a key recovery block signal from a sender to a receiver over a communication link using a first communications protocol program that has a method for a sender to send arbitrary data and a first receiving method for a receiver to receive and acknowledge the arbitrary data, an entity coupled to the link to monitor the key recovery block signal, comprising:
means for sending a message signal by a sender using the first sending method to send arbitrary data, and including in the message a key recovery block signal; and
means for receiving and acknowledging the message by a receiver with an acknowledge signal using the first receiving method to receive and acknowledge the arbitrary data.

35. The system of claim 34, which further comprises:
means for sending over the link a data message signal encrypted with a key capable of recovery using the key recovery block signal.

36. The system of claim 35, which further comprises:
means for said entity to monitor data in the encrypted data message by means of the key recovery block signal.

37. A article of manufacture for a computer for communicating a key recovery block from a sender to a receiver over a communication link using a first communications protocol that has a first receiving method for a sender to send arbitrary data and a first receiving method for a receiver to receive and acknowledge the arbitrary data, for an entity coupled to the link to monitor the key recovery block signal, comprising:

a computer readable medium;

computer program means in said medium for sending a message signal by a sender using the first sending method to send arbitrary data, and including in the message a key recovery block signal; and computer program means in said medium for receiving and acknowledging the message by a receiver with an acknowledge signal using the first receiving method to receive and acknowledge the arbitrary data.

38. The article of manufacture for a computer of claim 37, which further comprises:

computer program means in said medium for sending a data message signal over the link encrypted with a key capable of recovery using the key recovery block signal.

39. The article of manufacture for a computer of claim 38, which further comprises:

computer program means in said medium for said entity to monitor data in the encrypted data message by means of the key recovery block signal.

\* \* \* \* \*